United States Patent [19]

Kitajima et al.

[11] 4,323,308
[45] Apr. 6, 1982

[54] COPY MAGNIFICATION MODIFYING APPARATUS

[75] Inventors: Tadayuki Kitajima; Yoshikuni Tohyama, both of Yokohama, Japan

[73] Assignee: Canon Kabushiki Kaisha, Tokyo, Japan

[21] Appl. No.: 221,621

[22] Filed: Dec. 31, 1980

Related U.S. Application Data

[63] Continuation of Ser. No. 99,996, Dec. 4, 1979, abandoned.

[30] Foreign Application Priority Data

Dec. 8, 1978 [JP] Japan ................................. 53-151768
Dec. 8, 1978 [JP] Japan ................................. 53-151769

[51] Int. Cl.³ ..................... G03B 27/34; G03B 27/40; G03B 27/70
[52] U.S. Cl. .................................... 355/57; 355/8; 355/66
[58] Field of Search ....................... 355/57, 3 R, 8, 11, 355/50, 51, 65, 66, 58, 55

[56] References Cited

U.S. PATENT DOCUMENTS 3,598,489 8/1971 Thomas et al. .................... 355/66 X
3,614,222 10/1971 Post et al. ......................... 355/66 X
3,873,189 3/1975 Whitaker et al. ................. 355/55 X
3,884,574 5/1975 Doi et al. .............................. 355/66

Primary Examiner—Richard A. Wintercorn
Attorney, Agent, or Firm—Fitzpatrick, Cella, Harper & Scinto

[57] ABSTRACT

A copy magnification modifying apparatus for changing the copy magnification by displacing optical members involved in the image formation to and maintaining the same at a position capable of forming an image of a selected magnification of an original onto a photosensitive member, including a rotary drive source, an optical member displacing mechanism for transmitting the drive force of the rotary drive source through one-directional rotary clutch and resilient member to said optical members thereby guiding the same along a determined path, an optical member stopper for stopping said optical members at a position corresponding to the selected image magnification, and a drive source control system adapted for continuing the function of the rotary drive source after the stopping of the optical members to cause a deformation in a resilient member thereby generating a resilient force biasing the one-directional rotary clutch in a direction opposite to the rotating direction thereof.

16 Claims, 9 Drawing Figures

COPY MAGNIFICATION MODIFYING APPARATUS

This is a continuation of application Ser. No. 099,996, filed Dec. 4, 1979, now abandoned.

BACKGROUND OF THE INVENTION

1. Field of the Invention

The present invention relates to a copy magnification modifying apparatus for use in a copier with variable magnification, and more particularly to a copy magnification modifying apparatus capable of shifting the position of optical members such as imaging lens at the modification of the copy magnification in such a manner that the photosensitive member and the original to be copied are maintained in a mutually conjugate relationship at the selected magnification.

2. Description of Prior Arts

As already well known an image of the original with a magnification $b/a$ ($=m$) can be formed on the photosensitive member under the following conditions:

$$1/a + 1/b = 1/f$$

wherein a is the optical distance from the original to the lens, b is the optical distance from the lens to the photosensitive member and f is the focal length of the lens. In case of modifying the magnification, the above-mentioned values a and b should be modified in such a manner that the ratio $b/a$ becomes equal to the newly selected copy magnification and that thus modified values a and b still satisfy the foregoing equation. For example in a copier in which first and second reflecting means are displaced at a speed ratio of 1:½ for scanning the original and performing a slit exposure of the image of the thus scanned original onto a moving photosensitive member through a lens and a slit, the above-mentioned modification of values a and b is generally achieved by a change in the mutual positional relationship between said first and second reflecting means combined with a displacement of said lens.

In such copier the positional accuracy of the movable optical members such as a lens or mirror at each selected magnification is extremely important as an eventual aberration in the optical distance a or b will result in an incorrect magnification or in an unfocused low-quality image. Consequently it is required to constantly stop the optical members such as the lens or mirror exactly at the predetermined positions and to securely maintain such members at said positions.

For example there is already known a lens displacing mechanism, as disclosed in the U.S. Pat. No. 3,884,574, in which a lens carriage mounted on a wire supported between two pulleys and selectively driven forward or backward by a reversible motor actuates, at a position corresponding to a selected magnification, one of plural microswitches provided along the displacing path of said lens carriage whereby the motor is stopped by the signal from the thus actuated microswitch to position the lens at said position. However, an exact positioning of the lens is difficult to achieve with such known mechanism, since the position detecting elements such as microswitches generally involve certain deviation in the functioning point among themselves and thus require fine adjustment for achieving an improved detection accuracy, and also since a certain fluctuation in the functioning point is unavoidable even in a single microswitch. In addition, after the power supply to the motor is interrupted by the signal from the micro-switch, the motor continues to rotate for a while by the inertia, thus resulting in an uncontrollably unstable aberration between the detecting position and the actual stopping position.

The known mechanisms disclosed in the U.S. Pat. Nos. 3,873,189 and 3,598,489 are also associated with similar drawbacks.

Also there is known a mechanism for lens positioning, as disclosed in the U.S. Pat. No. 3,614,222, in which a link mechanism resiliently connected by a spring is displaced by a rotary solenoid through a cam, whereby a lens carriage is resiliently pressed against a stopper. In such known mechanism the cam is also resiliently pressed by the spring which presses the lens carriage against the stopper. Consequently if the cam is not stopped in the exact position or is eventually displaced therefrom by the vibration, said resilient force may cause rotation of said cam, thus resulting in an unstable positioning of the lens. Particularly in a copier in which the original scanning is achieved by the reciprocating motion of the reflecting means or the original carriage, the forward and backward motions thereof tend to generate vibrations at the end points thereof which undesirably affect the cam as explained in the foregoing.

SUMMARY OF THE INVENTION

The object of the present invention is to provide a magnification modifying apparatus adapted for use in a copier with variable magnification and capable of exactly displacing the optical members involved in the image formation to a position corresponding to the selected image magnification.

Another object of the present invention is to provide a magnification modifying apparatus adapted for use in a copier with variable magnification and capable of displacing the optical members involved in the image formation to a position corresponding to the selected image magnification and maintaining said optical members securely at said position.

Still another object of the present invention is to provide a magnification modifying apparatus adapted for use in a copier with variable magnification and capable of stopping the optical members involved in the image formation exactly at a position corresponding to the selected image magnification and securely maintaining said optical members at said position with a simple structure.

Still another object of the present invention is to provide a magnification modifying apparatus adapted for use in a copier with variable magnification and capable of exactly displacing and stopping the optical members involved in the image formation at a position corresponding to the selected image magnification even with the use of position detecting elements involving fluctuations in the performance thereof such as microswitches or hall elements.

Still another object of the present invention is to provide a magnification modifying apparatus adapted for use in a copier with variable magnification and capable of firmly maintaining the stopping position of the optical members involved in the image formation even in the presence of mechanical vibrations associated with the original scanning.

Still other objects and advantages of the present invention will be made apparent from the following description.

DESCRIPTION OF THE PREFERRED EMBODIMENTS

Figure 1:
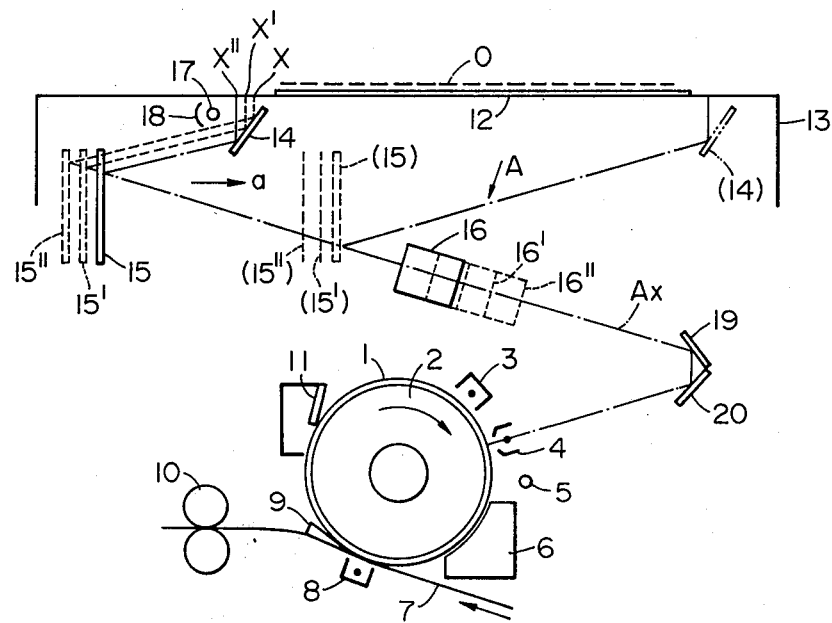
FIG. 1 is a schematic view of a copier in which the present invention is applicable.

Referring to FIG. 1, a photosensitive member 1 consisting of a conductive substrate, a photoconductive semi-conductor layer and a transparent insulating layer provided in succession on the periphery of a drum 2 is supported in a fixed position in the copier and is rotated in the direction of the arrow by means of an unrepresented motor. In the illustrated copier the rotating speed of the drum 2 is maintained constant regardless of the copying magnification. The photosensitive member 1 is at first uniformly charged (either positively or negatively, respectively, when said photoconductive semiconductor layer is N-type or P-type) by means of a DC corona discharger 3. Subsequently the photosensitive member 1 receives a slit exposure of a light image of a selected magnification formed from an original O to be copied through an optical system to be explained later and is simultaneously subjected to an AC corona discharge or a DC corona discharge of a polarity opposite to that of said DC corona discharger 3 by means of a corona discharger 4 having a slit aperture for passing the imaging light beam. The photosensitive member 1 is then uniformly illuminated by a lamp 5 to form thereon an electrostatic latent image of elevated contrast corresponding to said original. Said latent image is rendered visible by a developing station, and the thus obtained toner image is transferred onto a transfer sheet 7 by means of a transfer corona discharger 8. Said transfer sheet is supplied one by one from an unrepresented cassette to the photosensitive member 1 in synchronization with the original scanning, and then separated from said photosensitive member 1 by means of a separating claw 9. The toner image supported on said transfer sheet is fixed in a fixing station 10. On the other hand the toner remaining on the photosensitive member 1 after the image transfer is removed in a cleaning station 11, whereby the cleaned photosensitive member 1 is prepared for use again in the aforementioned imaging process.

The above-mentioned electrophotographic process may naturally be replaced by other processes, for example by so-called Carlson process.

The original O to be copied is placed on a flat original carriage 12, which is mounted on a fixed member 13, for example a side plate of the copier body. Said original is scanned by an optical system comprising a first mirror 14 and a second mirror 15. More specifically during the exposure of the original image onto the photosensitive member 1, said first and second mirrors 14, 15 perform forward displacement in the direction of arrow a which is parallel to the original carriage in synchronization with the rotation of the drum 2. The speed of said first mirror 14 is equal to the peripheral speed of the drum 2 or the photosensitive member 1 multiplied by the reciprocal of the copy magnification or of the imaging magnification of an imaging lens 16, while the speed of said second mirror 15 is equal to one half of that of said first mirror 14. The displacements of the first and second mirrors 14, 15 in the same direction with a speed ratio of 1:½ maintains the optical distance between the lens 16 and the original at a constant value corresponding to the selected image magnification. During said mirror displacement, the lens 16 is naturally maintained at a fixed position corresponding to the selected image magnification.

Upon completion of the scanning from one end to the other of said original by the above-mentioned scanning optical system, the mirrors 14 and 15 are stopped and reversed to the original home positions from which the forward mirror displacements for original scanning are to be initiated.

An original illuminating lamp 17 and a concave mirror 18 provided therebehind are supported by unrepresented supporting means integrally with the first mirror 14 so as to move therewith. The light reflected by the original O is directed by the first mirror 14 toward the second mirror 15 which again reflects said light downward toward the imaging lens 16. The imaging light beam emerging from said lens 16 reaches the photosensitive member 1 as explained in the foregoing after successive reflections by third and fourth mirrors 19, 20 fixedly provided in the copier. In FIG. 1 it is assumed that a real-size image of the original is focused on the photosensitive member 1 when the mirrors 14, 15 and the lens 16 are located in the full-lined positions. In order to modify the copy magnification, the lens 16 is displaced, in a manner as will be explained later, from the full-lined position by a distance corresponding to the selected copy magnification m, and simultaneously the first mirror 14 is also displaced by a distance corresponding to the selected copy magnification m in a direction parallel to the original carriage 12, in such a manner that the aforementioned optical path lengths a and b, respectively, become equal to $(m+1)f/m$ and $(m+1)f$.

In the apparatus of FIG. 1 in which the third and fourth mirrors 19, 20 are fixed, the lens 16 is displaced in a direction to shorten the optical distance to the photosensitive member 1 while the mirror 14 is displaced in a direction to lengthen the optical distance to the mirror 15 for a value of m smaller than unity, and vice versa.

The apparatus shown in FIG. 1 allows the copying at the real-size magnification, at a first reduction magnification m1 ($<1$) and at a second reduction magnification m2 ($<$m1), with the lens 16 being respectively located at the full-lined position, broken-lined positions 16' and 16'.

However, if the forward motion of the first mirror 14 for original scanning in the direction of arrow a is to be initiated from the position thereof displaced by the above-mentioned operation for modifying the magnification, the position of the original on the original carriage has to be changed for each copy magnification. For this reason the first mirror 14 is once returned, just before the start of the copying operation, to the full-lined position in FIG. 1 from the above-mentioned position after a displacement corresponding to the selected magnification. Such returning motion of the first mirror 14 results in, by means of the mirror drive mechanism to be explained later, a simultaneous displacement of the second mirror 15 by an amount equal to one half of that of said first mirror 14, whereby the optical distance between the original and the lens being maintained at a value $(m+1)f/m$. In this manner it is rendered possible to adopt the same home position for the first mirror 14 for any magnification by adopting the home position for the second mirror 15 at the full-lined position in FIG. 1 for the real-size copying and at the broken-lined positions 15' and 15", respectively, for the magnifications m1 and m2. For a similar reason the first mirror 14 terminates the forward motion at the same point (14) for any magnification but the second mirror 15 terminates the forward motion at the point (15), (15') or (15") respectively for the real-size magnification, or the magnification m1 or m2. The means for returning the first mirror 14 to the same home position after the operation for modifying the magnification and prior to the start of copying operation combined with a corresponding displacement of the second mirror 15 is detailedly disclosed in the U.S. Patent Application Ser. No. 859,254 or the German Patent Application DOS No. 2755498 of the present applicant.

The change of the position of the optical axis reflected by the first mirror 14 resulting from the modification of the magnification, as represented by X, X' and X" in FIG. 1, can be compensated by changing the starting time of the forward motion of said mirrors 14 and 15 with respect to the rotation of the drum 2, in response to the selected magnification.

Also in placing the original on the original carriage 12, it is desirable that two mutually orthogonal edges of said original can be aligned to a fixed standard position regardless of the selected magnification. On the other hand, the transfer sheet 7 is usually supplied, in consideration of the separating operation from the photosensitive drum, in such a manner that a lateral edge of the sheet parallel to the advancing direction thereof is maintained at a determined position regardless of the size of said sheet. Consequently a lateral edge of the image of the original corresponding to said lateral edge of the transfer sheet has to be focused on a determined position on the photosensitive drum regardless of the selected magnification, and for this reason the lens 16 has to be displaced in a direction synthesized from a vector along the optical axis Ax and a vector perpendicular to said axis Ax and parallel to the generatrix of the photosensitive drum. The amount of displacement $\Delta l_{12}$ in said perpendicular direction in case of a modification of magnification from m to m' is given by the following equation:

$$\Delta l_{12} = (m-m')l_1/1+m'$$

wherein $l_1$ is the distance between the position of the optical axis on the original and the position of lateral edge taken as standard for a magnification m.

Figure 2:
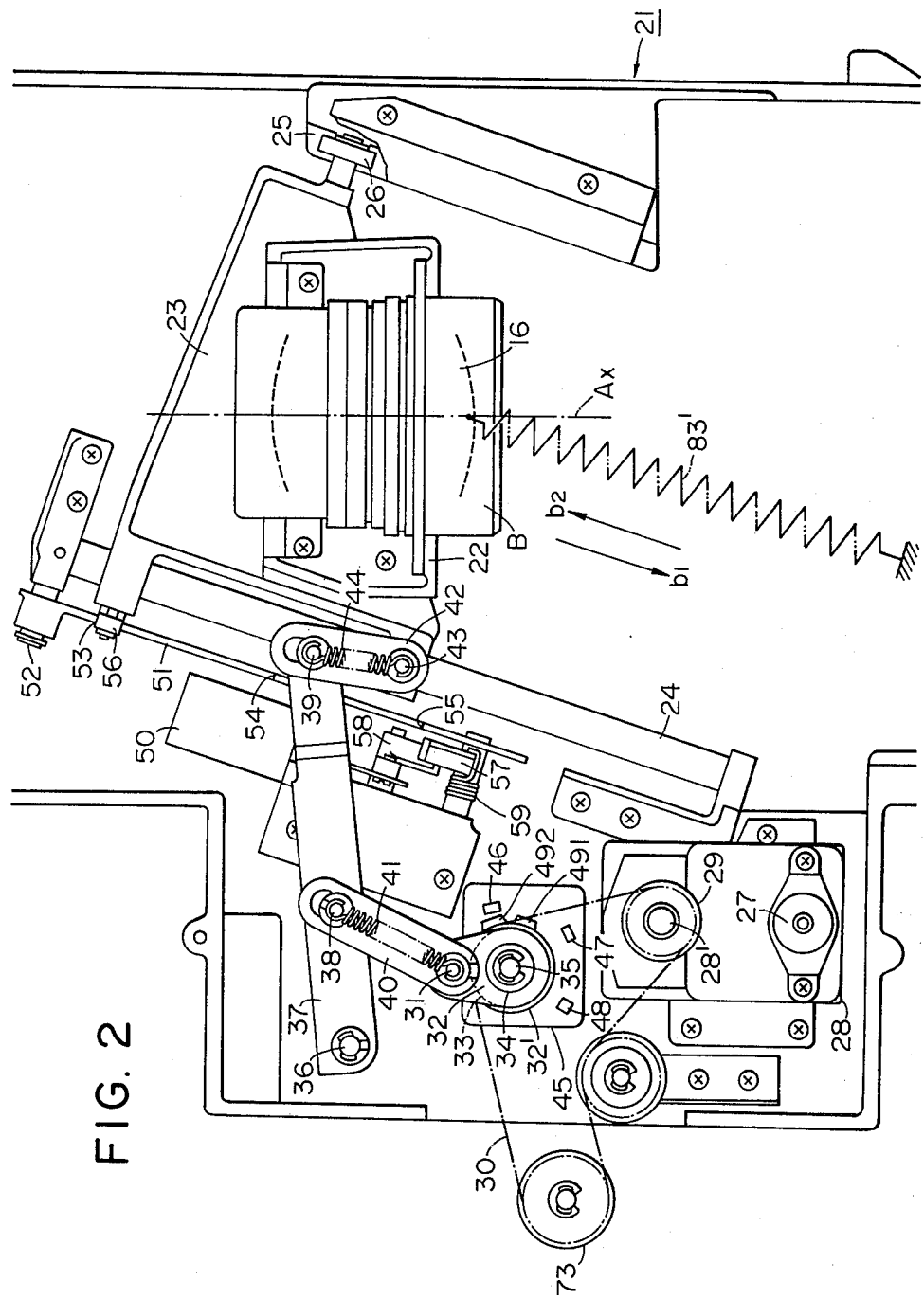
FIG. 2 is a lateral view of a lens position shifting mechanism embodying the present invention.

FIG. 2 shows the lens position shifting mechanism seen from a direction of arrow A in FIG. 1 perpendicular to the optical axis Ax.

In a lens box 21 fixed in the copier there is displaceably provided a lens tube B housing the lens 16 therein. Said lens tube B is fixed on a support member 22 which is in turn fixed on a movable carriage 23 slidably supported and guided by two guides 24 and 25 provided in said lens box along the displacing direction of said lens.

For this purpose said movable carriage 23 is provided, along a lateral side thereunder, with slide bushings (not shown) slidably fitted on said guide 24 and also with a roller 26 supported on said guide 25 at the other side.

The lens drive mechanism provided at the side of said guides is driven by a one-way motor 27 having a gear box 28 incorporating a clutch. The output shaft 28' of said gear box is provided with a sprocket 29, so that a chain 30 engaging therewith is driven by said motor 27 to rotate a sprocket 73 to be explained later and another sprocket 33 mounted on a shaft 31 integrally with a rotary drive plate 32. In the center of said sprocket 33 there is firmly fitted a one-way rotary clutch 34 which in turn is rotatably fitted on an unrotating shaft 35 provided in a determined position in said lens box 21 in such a manner that said clutch can rotate clockwise but not anticlockwise. A pivotable link 37 is pivotably mounted at an end thereof on another fixed shaft 36 in the lens box 21 and is provided at the center and at the other end with two pins 38, 39. Said center pin 38 and a pin 31 fixed on said rotary drive plate 32 respectively engage with end holes of a link plate 40 in such a manner that it is pivotable to said link plate 37 and rotary drive plate 32. At least one of said end holes (the one engaging with the pin 38 in the illustration) is shaped oblong, and a tension coil spring 41 provided between said pins 31 and 38 biases said pin 38 in such a direction as to minimize the distance between said pins. The other pin 39 of said pivotable plate 37 is fitted in an end hole of another link plate 42 of which another end hole is fitted on a pin 43 fixed on the movable carriage 23 in such a manner that said link plate 42 is pivotable with respect to the link plate 37 and movable carriage 23. At least one of said end holes of the link plate 42 (the one engaging with the pin 39 in the illustration) is made oblong, and another tension spring 44 provided between said pins 39 and 43 biases said pin 39 of the pivotable plate 37 in such a direction as to minimize the distance between said pins 39 and 43. The above-explained link mechanism between the rotary plate 32 and the movable carriage 23 converts the one-way rotary motion of said rotary plate in the clockwise direction into linear reciprocating motions of the lens 16 or the movable carriage 23 therefor along the guides 24 and 25 in the directions b1 and b2. In the illustrated embodiment, as the optical axis of the lens is inclined with respect to the horizontal plane (cf. FIG. 1), the shifting direction of the lens is inclined to the horizontal plane. Consequently the lens shifting force contains a component vector to the direction of gravitation.

Figure 3:
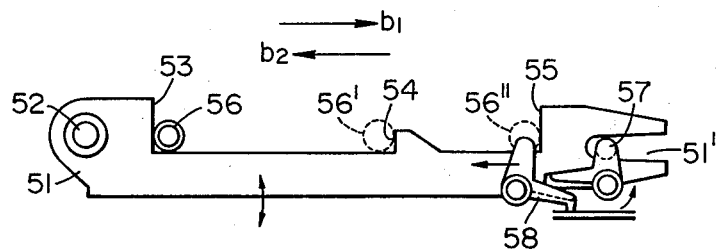
FIG. 3 is a lateral view of the stop plate shown in FIG. 2.

As shown in FIGS. 2 and 3 a stop plate 51 for stopping the lens at positions corresponding to different magnifications is provided parallel to the guide rail 24 and is pivotably supported by a shaft 52 fixed in the lens box. On the upper face of said stop plate 51 there are provided shoulders 53, 54 and 55 corresponding to the stop positions of said lens at different magnifications, said shoulders being adapted to engage with a roller 56 provided on a lateral face of the movable carriage 23, whereby the copying with the real-size magnification or with the magnification m1 or m2 being achievable respectively when said roller 56 engages in the full-lined position with the shoulder 53, or in the broken-lined position 56' or 56" with the shoulder 54 or 55. Said stop plate 51 is pivoted by a solenoid 50 and a spring 59 through lever 57 and 58. The spring 59 applies a resilient biasing force in the anticlockwise direction in FIG.

3 to the shaft of the lever 57, which, through a pin thereof engaging with an end recess at the right-hand end of the stop plate 51, biases said plate anticlockwise thereby causing the shoulder 54 to engage with the roller 56. The lever 58 of which an arm engages with an arm of said lever 57 as shown in FIG. 3 is rotated in the direction of arrow shown in FIG. 3 by the other arm connected to a plunger of the solenoid 50 when it is energized. Said rotation of the lever 58 rotates the lever 57 clockwise against the biasing force of the spring 59, thereby causing clockwise pivoting of the stop plate 51, whereby the roller 56 becomes capable of move over the shoulder 54. The shoulders 53 and 55 have a larger height than the shoulder 54 in order to stop the displacement of the roller 56 regardless of the position of said stop plate 51.

In order to control the function of said motor 27 and lens stop plate 51, there are provided, as shown in FIG. 2, three Hall elements 46, 47 and 48 on a blanket 45 fixed in the lens box 21, and the aforementioned rotary plate 32 is provided integrally therewith a rotary actuating plate 32' having magnets 491 and 492 for activating said Hall elements in succession. Said magnets 491 and 492 are spacedly positioned along the rotating direction (clockwise in FIG. 2) of said actuating plate 32' rotating integrally with the rotary plate 32 about the shaft 35, so that each of said Hall elements is activated at first by the magnet 491 and then by the magnet 492. Said Hall elements are fixed in positions respectively corresponding to the real-size magnification and magnifications m1 and m2.

Upon actuation of a magnification selecting button provided on a control panel of the copier, the solenoid 50 is energized to lower the stop plate 51 by a determined angle about the shaft 52, and simultaneously the motor 27 is energized to initiate the clockwise rotation of the rotary plate 32 together with the actuating plate 32', thus causing the displacement of lens 16 and the rotation of magnets 491 and 492. The magnet 491 is provided in such a manner that it reaches a Hall element 46, 47 or 48 corresponding to the newly selected magnification and generates a signal therefrom immediately before the lens 16 reaches a stop position corresponding to said newly selected magnification. Said signal terminates the power supply to the solenoid 50, whereby it is elevated by a determined angle about the shaft 52 and the roller 56 becomes engaged with either one of said shoulders 53, 54 and 56 corresponding to said newly selected magnification, thus terminating the displacement of the lens 16. However the motor 27 continues to rotate in this state, so that the magnet 492 reaches a Hall element 46, 47 or 48 corresponding to the newly selected magnification and generates a signal therefrom soon after the termination of the displacement of lens 16. Said signal terminates the power supply to said motor 27, thus terminating the rotation thereof. In this manner it is rendered possible to stop and maintain the lens securely and stably at the exact position, by generating two signals immediately before and immediately after the arrival of the lens at a position corresponding to the selected magnification, and separately controlling the lens stopping means and the rotary drive source by means of said signals. The distance between said magnets 491 and 492 is variable according to the lens shifting speed and the elastic constants of the springs 41, 44 and is advantageously determined in such a manner that the magnet 491 reaches a Hall element corresponding to the selected magnification when the lens 16 is located 5 to 30 mm before the stop position therefor corresponding to said selected magnification, and that the magnet 492 reaches said Hall element after a time required for the lens 16 to move over a distance of 5 to 30 mm if it continues to move beyond said stop position corresponding to said selected magnification. However these figures are not critical and may be made smaller or larger.

The function of the apparatus of the present invention will be clarified further in the following. In case the lens is to be shifted from a first position (for real-size copying) to a second position (for copying with a magnification m1), a magnification selecting button in the control panel of the copier is actuated. Thereupon the solenoid 50 is energized to lower the stop plate 51, and the motor 27 is successively powered. In response, the sprocket 29 mounted on the output shaft 28' of the gear box initiates clockwise rotation in FIG. 2 to clockwise rotate, through the chain 30, the sprocket 33 having the one-way rotary clutch 34, rotary plate 32 and the actuating plate 32'. The rotation of said rotary plate 32 actuates the aforementioned link mechanism to initiate the displacement of the lens 16 in the direction of arrow b1 from the position for real-size copying. Immediately before the arrival of the roller 56 at the shoulder 54 of the stop plate 51, said magnet 491 activates the Hall element 47 to terminate the power supply to the solenoid 50, whereby the levers 57 and 58 are returned to the original positions thereof by a return spring 59 to cause the stop plate 51 to elevate to the determined position. Subsequently the roller 56 reaches the shoulder 54 and is firmly pressed thereagainst by the resilient force of the spring 41 provided between the pins 31 and 38 along the link plate 40, since the power supply to the motor 27 is not yet interrupted in this state. In this manner the lens is exactly stopped and maintained at the second position. Subsequently, after the lapse of a determined time from the activation of the Hall element 47 by the magnet 491, namely after the resilient contact of the roller 56 to the shoulder 54 is securely achieved, the magnet 492 activates the Hall element 47 to terminate the power supply to the motor 27. Also in case of the lens shifting from said second position to the third position for the copying with a magnification m2, in response to the actuation of another magnification selecting button, the solenoid 50 is similarly energized to lower the stop plate 51, thus releasing the roller 56 from the engagement with the shoulder 54. At a determined time after said solenoid energization, the motor 27 is powered to shift the lens in the direction of arrow b1 by means of said link mechanism. In this case the roller 56 goes over the lowered second shoulder 54 and proceeds toward the third shoulder 55. The stopping of the lens at said third position is achieved in the identical manner as explained above except that the Hall element 48 is employed for control in this case. Also the returning shift of the lens from the third position to the first is achieved in the identical manner except that the lens is displaced in the direction of arrow b2 and that the Hall element 46 is employed for control in this case. In this case the spring 44 is extended instead of the spring 41 to exert a resilient force for pressing the lens against the first shoulder 53 of the stop plate.

The lens can be stopped at the second position in the forward shifting from the first position but not in the reverse shifting from the third position toward the first position. Consequently in case of changing the copy magnification from m2 to m1, the lens is shifted from the third position to the first and then to the second. Such shifting is rendered possible by a fact that the actuating plate 32' having the magnets 491 and 492 rotates clockwise only so that said magnets reach the Hall element 46 after passing through the Hall element 48.

Also the above-explained control of the solenoid 50 and of motor 27 can be achieved by a program of a microcomputer receiving the signals from said Hall elements. Also for this purpose there can be employed a circuit as shown as a block diagram in FIG. 4.

Figure 4:
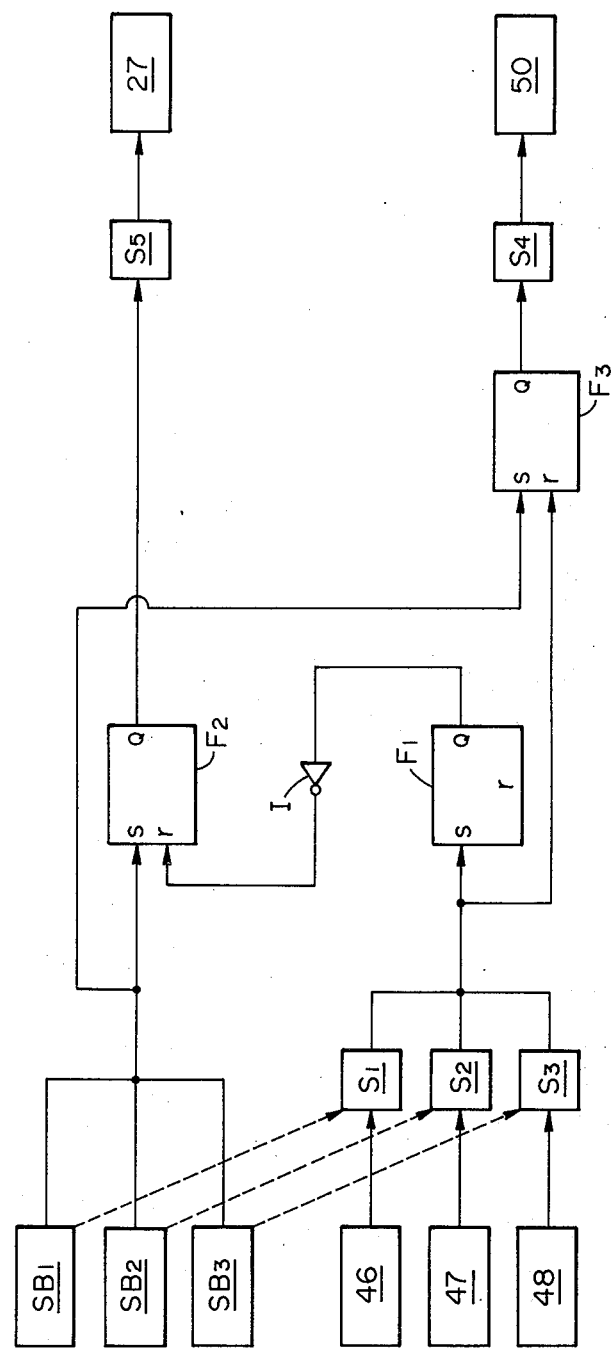
FIG. 4 is a block diagram of an embodiment of the control circuit.

In FIG. 4 there are shown magnification selecting buttons SB1, SB2 and SB3 respectively for the real-size magnification, a magnification m1 and another magnification m2; switching circuits S1, S2 and S3 for selectively transmitting the short pulse signals generated by Hall elements 46, 47 and 48 in response to the function of magnets 491 and 492 to the flip-flops F1 and F3, wherein said button SB1 closes the switch S1 alone to allow the transmission of the signal from the Hall element 46 alone to said flip-flops F1 and F3 while the button SB2 or SB3 respectively closes the switch S2 or S3 alone in the similar manner; a flip-flop F1 for releasing a level-1 signal or a level-0 signal respectively upon receipt of an input signal at the port S and upon receipt of a subsequent input signal at the port S; flip-flops F2 and F3 for releasing a level-1 signal or a level-0 signal upon receipt of an input signal respectively at the port S or at the port R; switching circuits S4 and S5 respectively for controlling the power supply to the solenoid 50 and the motor 27 and adapted to be closed or opened respectively by the level-1 signal or the level-0 signal respectively from the flip-flops F3 and F2; and an inverter I for supplying an inverted output signal from the flip-flop F1 to the port R of the flip-flop F2.

Upon actuation of for example the button SB2 in a state for copying with real-size magnification or with a magnification m2, the output signal from the flip-flop F3 closes the switch S4 to energize the solenoid 50, and the output signal of the flip-flop F2 closes the switch S5 to initiate the power supply to the motor 27. Also since the switch S2 alone is closed in this state, the signal generated by the Hall element 47 in response to the magnet 491 is supplied to the flip-flop F3 to terminate the output signal therefrom, thus opening the switch S4 and deactivating the solenoid 50. The above-mentioned signal is supplied also to the flip-flop F1 to derive a level-1 signal therefrom, which is in turn supplied, after inversion by the inverter I, to the flip-flop F2, whereby said flip-flop F2 continues to release the signal. Upon subsequent inter-action of the magnet 492 with the Hall element 47, the flip-flop F1 releases a level-0 signal which is supplied, after inversion by the inverter I, to the flip-flop F2, whereby said flip-flop F2 releases a level-0 signal, thus turning of the switch S5 and terminating the power supply to the motor 27. Also a similar procedure takes place in response to the actuation of the button SB1 or SB3.

Since the power supply to the motor 27 is interrupted in a state that the spring 41 or 44 in the afore-mentioned link mechanism is extended after the contact of the roller 56 with the shoulder 53, 54 or 55 of the stop plate 51, said spring generates a force to inversely rotate said rotary drive plate 32 through said link mechanism. However said plate 32 is unable to rotate anticlockwise because of the engagement of said one-way rotary clutch 34 in the sprocket 33 with the fixed shaft 35, so that the resilient force of said spring functions to maintain a close contact between the roller 56 and the shoulder of said stop plate 51, thereby securing the lens at the position corresponding to the selected magnification. In this manner the resilience of said spring not only secures the one-way rotary clutch 34 at a fixed position but also firmly presses the roller 56 against the shoulder of said stop plate 51, so that the lens can be stably maintained even in the presence of vibration resulting from the reciprocating motions of the scanning mirrors or in the presence of gear backlash or dimensional play or error in the transmission or link mechanism or in the one-way rotary clutch. Also as will be apparent from the foregoing explanation, the position of the magnets 491, 492 or of the Hall elements does not require excessive precision so that these components can be mounted without fine adjustment at the assembly of the copier.

In addition it is also possible to employ only one magnet 491 instead of two magnets. In such case the signal generated by the Hall element in response to said magnet 491 may not only be used for immediately terminating the power supply to the solenoid 50 but may also be supplied to a delay circuit which generates a delayed signal for terminating the power supply to the motor 27. As explained in the foregoing, said delayed signal is to be released immediately after the lens is stopped at the desired position. Alternatively there may be employed two Hall elements for each magnification in place of said delay circuit. In such case each of said Hall elements 46, 47 and 48 is associated with an additional Hall element located at the downstream side with respect to the rotating direction of the magnet 491, wherein said additional Hall elements being utilized for stopping the motor 27 while the Hall elements 46, 47 and 48 being utilized exclusively for deactivating the solenoid 50. Said additional Hall elements are located in such a manner that the magnet 491 reaches each of said element immediately after the lens is stopped at the desired position. Furthermore the above-mentioned Hall elements and the magnets may be respectively replaced by microswitches and a cam for controlling actuators for said microswitches. In summary the objects of the present invention can be achieved by generating signals immediately before and after the arrival of the lens at the position corresponding to the selected magnification by means of a positional detection, in relation to the lens position, of an arbitrary movable member, preferably a one-directionally rotating member, in the lens shifting mechanism, thereby controlling the function of the solenoid 50 and the motor 27.

Figure 5:
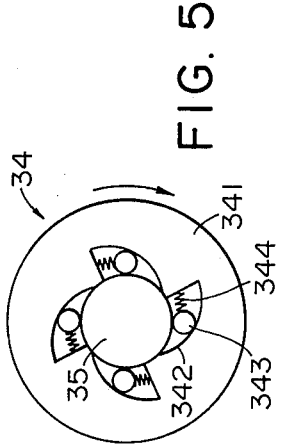
FIG. 5 is a schematic view of an embodiment of a one-directional rotary clutch.

In the following there will be given a brief explanation on an example of the aforementioned one-way rotary clutch, shown in FIG. 5. The clutch 34 comprises an annular member 341 rotatably fitted on the fixed shaft 35 and provided with ratchet-shaped recesses 342, in which rollers 343 are biased by springs 344 toward the narrower spece between the recesses 342 and the shaft 35. By means of the above-explained structure the annular member 341 is rendered rotatable in the direction of arrow but is unable to rotate in the opposite direction as, under the application of a torque in said opposite direction, said rollers 343 become squeezed into the narrower space between said recesses 342 and the shaft 35 to prevent such rotation.

In the following there will be given an explanation on a mechanism for changing the relative positional relationship between the first and second mirrors 14 and 15 for modification of the magnification.

Figure 6:
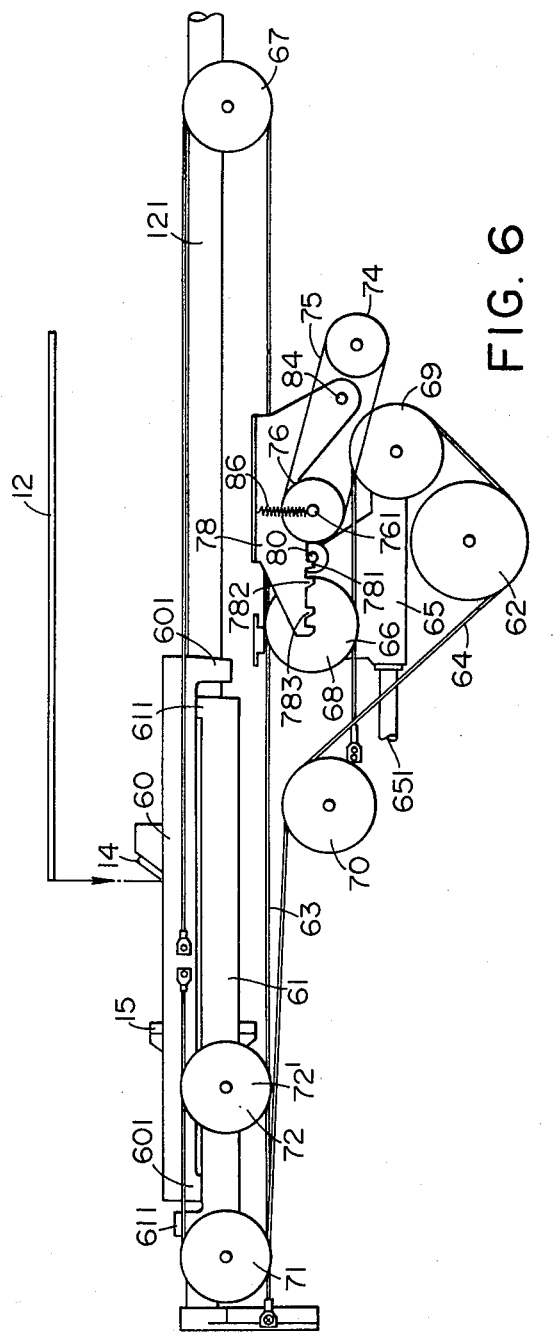
FIG. 6 is a lateral view of an embodiment of the mirror drive mechanism.

Referring to FIG. 6, the first and second mirrors 14, 15 are respectively mounted in first and second mirror carriages 60, 61 respectively provided with leg portions 601, 611 slidably fitted on a guide rail 121 provided along the original scanning direction. Said carriages 60, 61 are mutually connected by a drive pulley 62 and wires 63 and 64. The wire 63 connected at an end thereof to the first mirror carriage 60 is guided through a pulley 72 rotatably supported on the second mirror carriage 61 and then through another pulley 66 rotatably supported on a shifting plate 65, and is fixed, at the one end, to a fixed member in the copier. The second wire 64 similarly fixed at an end thereof to said first mirror carriage 60 is guided through a fixed pulley 67, then through annular pulley 68 provided coaxially with the above-mentioned pulley 66 on said shifting plate 65 and capable of relative rotation with respect to said pulley 66 and further through another pulley 69, then wound several turns on the drive pulley 62 to be driven by an unrepresented motor, further guided by a pulley 70, a fixed pulley 71 at the left-hand end and another pulley 72' provided coaxially with the above-mentioned pulley 72 on the second mirror carriage and capable of relative rotation with respect to said pulley 72, and finally fixed to a fixed member in the copier body. Said pulleys 62, 67, 69, 70 and 71 are rotatably supported on fixed members in the copier body, wherein said pulleys 67 and 71 being positioned outside the stroke of forward (to the right in FIG. 6) and backward motions of the carriages 60, 61. Also the pulley 69 is positioned further right to the rightermost positions of pulleys 66 and 68 resulting from the displacement of the shifting plate 65. The wire 64 is provided parallel to the guide rail 121 in the portions between the carriage 60 and pulley 67, between the pulleys 67 and 66, between the pulleys 68 and 69, between the pulleys 71 and 72', and between the pulley 72' and said the other fixed end on the fixed member. Also the wire 63 is provided parallel to the guide rail 121 in the portions between the carriage 60 and pulley 72, between the pulleys 72 and 66, and between the pulley 66 and said the other fixed end to the fixed member. Said wires 63 and 64 may instead be composed of a single wire, in which case a suitable intermediate portion thereof may be fixed to the carriage 60.

By rotating said pulley 62 clockwise and at a speed corresponding to the selected magnification by means of an unrepresented motor, the carriages 60 and 61, or the mirrors 14 and 15, are displaced to the right in FIG. 6 at a speed ratio of 1:½ for scanning the original. Upon completion of the scanning, the pulley 62 is rotated counterclockwise whereby the mirrors 14 and 15 are reversed to the left with a speed ratio of 1:½ and returned to the home positions thereof.

At the modification of the magnification, two pulleys 66 and 68 are displaced in the lateral direction in FIG. 6 by the shifting plate 65 to modify the relative positional relationship between the first and second mirrors thereby performing the correction of the optical path length.

Figure 7:
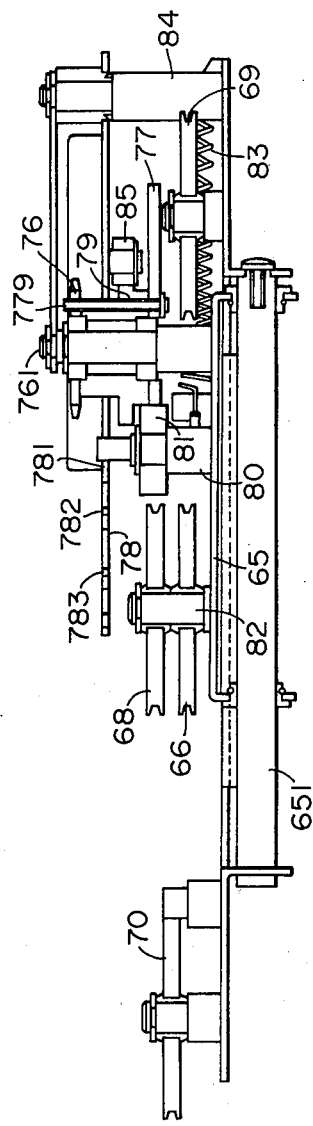
FIG. 7 is a plan view of an embodiment of the mirror position shifting mechanism.
Figure 8:
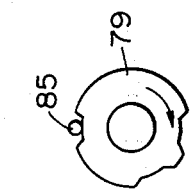

The shifting plate 65 is slidably mounted on a guide rail 651 provided parallel to the rail 121, and is displaced along said guide rail 651 in the following manner. The lens driving chain 30 shown in FIG. 2 also rotates an unrepresented bevel gear integral with the sprocket 73 and meshing with another unrepresented bevel gear, which in turn drives a sprocket 74 provided integrally therewith and a second chain 75. As shown in FIG. 6 the chain 75 drives a sprocket 76 rotatably fitted on a fixed shaft 761 provided on a fixed member in the copier body. As shown in FIG. 7, said sprocket 76 is linked, by means of a screw 779, to a first cam member 77 and a second cam member 79. The shifting plate 65 is provided with a fixed shaft 80 rotatably supporting a cam follower 81 engaging with said first cam member 77 and another fixed shaft 82 coaxially supporting said pulleys 66 and 68. Said shifting plate 65 is biased by a tension spring 83 in a direction to maintain a resilient contact between said first cam member 77 and said cam follower 81. The end portion of the cam follower shaft 81 engages, during the copying operation, with a tooth 781, 782 or 783 of a toothed plate 78 corresponding to the selected copying magnification in order to prevent eventual displacement of the shifting plate 65, during the reverse motion of the second mirror, in a direction to dissociate the cam follower 81 from the first cam member 77. Said toothed plate 78, having teeth 781, 782 and 783 respectively corresponding to the real-size magnification and magnifications m1 and m2, is pivotably mounted on a shaft 84 provided on a fixed member in the copier body and is resiliently biased anticlockwise by a spring 84. Said plate is provided in the central portion thereof with a roller 85, which is maintained in pressure contact, by means of said spring 86, with said second cam member 79 of a shape as shown in FIG. 8. At the modification of the magnification, said second cam member 79 is rotated integrally with the sprocket 76 to elevate the toothed plate 78 through said roller 85, thereby liberating the shaft 80 from the engagement with the tooth of said toothed plate and thus enabling the displacement of the shifting plate 65. Upon completion of the modification of magnification the roller 85 becomes trapped in a recessed portion of the cam member 79, whereby the toothed plate 78 is lowered to the original position to prohibit the displacement of the cam follower to the left.

Upon actuation of a magnification selecting button, the motor is powered in the aforementioned manner to initiate the lens displacement, and simultaneously the sprocket 76 initiates rotation integrally with the cam members 77 and 79. At first the cam member 79 pushes the cam follower 83 to pivot the toothed plate 78 about the shaft 84, thereby liberating the shaft 80 from the engagement with the tooth as explained in the foregoing. Successively the cam follower 81 maintained in pressed contact with the cam member 77 by means of a spring 83 is also shifted by said cam member, whereby the shifting plate 65 is shifted together with the pulleys 66, 68 along the guide rail 651. Since the pulley 62 is maintained unrotatable in this state, the carriage 60 and the first mirror 14 are displaced by the wires 64 and 63, while the carriage 61 and the second mirror 15 being maintained unaffected. The motor 27 is stopped when, or slightly after, the pulleys 66 and 68 are stopped at positions corresponding to the selected magnification and the shaft 80 is trapped by a corresponding tooth 781 or 783 of the toothed plate 78.

In FIGS. 6 and 7, a leftward displacement of the shaft 80 or the cam follower 81 causes a rightward displacement of the first mirror 14 away from the second mirror 15 to increase the optical path length between the original and the lens, and vice versa.

Upon arrival of the shaft 80 at a position capable of engaging with a tooth 781, 782 or 783 of the toothed plate 78 corresponding to the selected magnification, or immediately prior thereto, the roller 85 becomes trapped in a recess of the cam member 79, whereby said plate 78 being lowered by means of the spring 86. In this manner the shaft 80 becomes engaged with one of said teeth, so that the shaft 80 together with the pulleys 66 and 68 is maintained in a position exactly corresponding to the selected magnification. In such state the cam follower 81 is naturally maintained in contact, by means of the spring 83, with a cam surface R1, R2 or R3 of the cam member 77 corresponding to the selected magnification.

Figure 9:
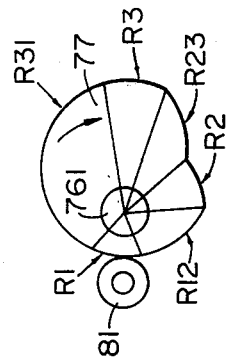
FIGS. 8 and 9 are schematic views showing the cam shapes.

As shown in FIG. 9, the cam member 77 is provided with a cam surface portion R1 of a smallest constant radius $r_1$ corresponding to the real-size magnification, another cam surface portion R2 of a second constant radius $r_2$ corresponding to the magnification $m_1$ and still another cam surface portion R3 of a largest constant radius $r_3$ corresponding to the magnification $m_2$. In the transient cam surface R12 between said portions R1 and R1 and in the transient cam surface R23 between said portions R2 and R3 the distance from the rotary center to the cam surface decreases progressively in the rotating direction (indicated by arrow), while it increases pregressively in the transient portion R31 between said portions R3 and R1.

Similarly as the cam member 79, the cam member 77 is driven only in one direction indicated by the arrow, and the aforementioned sprockets and gears are so selected that the cam members 77 and 79 respectively make one full turn corresponding to one full turn of aforementioned rotary drive plate 32.

In a state in which the cam follower 81 is in contact with the cam surface portion R12 or R23 during the rotation of the cam member 77 in the direction of the arrow, i.e. in a state of shifting of the pulleys 66, 68 from a position corresponding to the real-size magnification to a position corresponding to the magnification m1 or from said latter position to a position corresponding to the magnification m2, the spring 83 provided between a fixed member in the copier body and the shifting plate 65 is extended and is therefore charged with a resilient force therein. On the other hand, in a state in which the cam follower is maintained in contact with the cam surface R31 during the rotation of the cam member 77 in the direction of the arrow, i.e. in a state in which the pulleys 66, 68 are shifted from a position corresponding to the magnification m2 to a position corresponding to the real-size magnification, said cam surface R31 receives, through the cam follower 81, the resilient force accumulated in said spring 83 directed toward the rotary center of the cam member 77. As said cam surface has progressively increasing distance to the rotary center in the rotating direction, a part of said resilient force of the spring 83 received by the cam surface R31 functions to assist the rotation of said cam member 77 in the proper rotating direction thereof. Stated differently, a part of the resilient force charged in the spring 83 in the above-explained manner functions, at the release thereof, as a part of rotary driving force for the cam member 77.

It is to be recalled that, in the present embodiment, the lens axis Ax is inclined with respect to the horizontal plane, and, for this reason, lens displacements in a direction inclined with respect to the horizontal plane are required for modifying the magnification. In the present embodiment, the shift from the real-size magnification to the magnification m1 or m2 involves a downward lens displacement while the shaft from the magnification m2 to the real-size magnification involves an upward lens displacement.

In the former shift toward a reduced magnification, although the spring 83 is extended and charged along with the displacement of the first mirror 14 as explained in the foregoing, the lens displacement, which is downward in this case, is assisted partially by the weight of the lens (more exactly by a component in the lens displacing direction of the gravitational force caused by the weight of lens 16, lens tube B and support members 22, 23). Consequently, in spite of the fact that the motor 27 has to rotate in this state against the resilient force of the spring 83, the motor load is maintained relatively low because of the above-mentioned contribution of the lens weight.

On the other hand in the latter shift toward the real-size magnification from the smaller magnification m2, although the lens has to be displaced upward against the weight thereof, the associated displacement of the first mirror or the shifting plate 65 is assisted by a part of the resilient force discharged from the spring 83, as the rotation of the cam member 77 is promoted by said spring 83 in the aforementioned manner. Consequently, in spite of the fact that the motor 27 has to rotate against the weight of the lens, the motor load is maintained relatively low because of the discharge of spring 83.

In this manner it is possible to use of a low-power motor, which realizes an economy in space and in power consumption. Also in case the lens has a horizontal or nearly horizontal axis and is thus to be displaced in the horizontal or nearly horizontal direction, there may be provided, for example, a spring 83' represented by double-dotted chain line in FIG. 2.

Said tension spring 83', provided parallel to the guides 24, 25 and between the lens tube B and a fixed member in the copier body, is intended to be charged with the resilient force at the lens shifting from a position for the magnification m2 to the real-size magnification and to discharge said resilient force at the opposite lens shifting thereby assisting the lens displacement.

In such structure, said spring 83' discharges the resilient force when the aforementioned spring 83 is charged, and vice versa. It is therefore rendered possible to reduce the motor load by the complementary functions of the springs 83, 83' in the similar manner as achieved in the foregoing embodiment by the function of the spring 83 and of the partial force of the lens weight along the guides 24 and 25.

As explained in the foregoing, the first and second cam members 77, 79 are respectively designed to make one full turn in response to one full turn of the rotary driving plate 32, and are respectively provided with three functioning portions (R1, R2 and R3 of the cam 77; and three recesses of the cam 79), which are respectively extended over a certain angle along the rotating direction in order to displace and maintain the pulleys 66, 68 at exact positions even if the rotary drive plate 32 is not stopped at the exact position. This is due to a fact that the Hall elements 46, 47 and 48 are to be positioned in the present embodiment without rigorous adjustment and the timing of stopping the motor 27 for driving the cam members 77, 79 may involve certain fluctuation among different apparatus, so that the cam followers 81, 85 have to be positioned exactly even if the motor 27 is stopped a little earlier or later. On account of the above-mentioned structure, it is not necessary to conduct fine positioning adjustment between the lens shifting mechanism and the mirror displacing mechanism.

In the foregoing embodiment the relative positions of the first and second mirrors are changed in combination with the displacement of the lens for modifying the magnification, but it is also possible to change the positions of the third and fourth mirrors while maintaining the lens stationary, or to change the positions of the lens 16 and of the third and fourth mirrors 19, 20 while maintaining the first and second mirrors unshifted. In such cases it will be readily understood that a mechanism similar to that for lens shifting can be utilized for shifting the third and fourth mirrors.

What we claim is:

1. A copy magnification modifying apparatus for modifying the copy magnification by displacing an optical member involved in the image formation to and maintaining the same at a position adapted for forming an image of a selected magnification of an original onto a photosensitive member, comprising:
   carriage means for supporting said optical member;
   a rotary drive source;
   an optical member displacing mechanism for transmitting the drive force of said rotary drive source through one-directional rotary clutch means and resilient means to said optical member thereby guiding the same along a determined path;
   stopper means to engage with said carriage means thereby stopping said optical member at a position corresponding to the selected magnification; and
   control means adapted for continuing the function of said rotary drive source after the stopping of said optical member to cause a deformation in said resilient means thereby pressing said carriage means against said stopper means and generating a resilient force biasing said one-directional rotary clutch means in a direction opposite to the rotating direction thereof, and thereafter terminating the function of said rotary drive source.

2. A copy magnification modifying apparatus according to claim 1, further comprising, between said one-directional rotary clutch means and said carriage means, motion converting means for converting rotary motion into reciprocating motion.

3. A copy magnification modifying apparatus according to claim 2, wherein said resilient means is provided in said motion converting means.

4. A copy magnification modifying apparatus according to claim 2 or 3, wherein said motion converting means is a link mechanism.

5. A copy magnification modifying apparatus according to claim 1, 2 or 3, wherein said stopper means is rendered selectively movable between a retracted position and a functioning position, and said control means is adapted for moving said stopper means to said retracted position before displacing said carriage means and to return said stopper means to said functioning position before the arrival of said carriage means at a position corresponding to the selected magnification.

6. A copy magnification modifying apparatus according to claim 2 or 3, wherein said control means comprises rotational position detecting means adapted for detecting the rotational position of a one-directional rotary member in a rotary transmission mechanism provided between said motion converting means and said rotary drive source thereby generating a signal for terminating the function of said rotary drive source after the arrival of said optical member at a position corresponding to the selected magnification.

7. A copy magnification modifying apparatus according to claim 5, wherein said control means comprises rotational position detecting means adapted for detecting the rotational position of a one-directional rotary member in a rotary transmission mechanism provided between said motion transmitting means and said rotary drive source thereby generating a signal for shifting said stopper means to the functioning position before the arrival of said optical member at a position corresponding to the selected magnification and further generating a signal for terminating the function of said rotary drive source after the arrival of the optical member at said position.

8. A copying machine in which copy magnification is variable, comprising:
   first and second optical means for forming an image of an original to be copied on a photosensitive member;
   first movable means mechanically coupled with said first optical means, said first movable means being movable in forward and backward directions along a first passage to displace said first optical means to a position corresponding to a selected magnification;
   second movable means mechanically coupled with said second optical means, said second movable means being movable in forward and backward directions along a second passage to displace said second optical means to a position corresponding to the selected magnification;
   a driving source;
   first transmission means for transmitting a driving power from the driving source to said first movable means to move it along the first passage;
   second transmission means for transmitting a driving power from the driving source to said second movable means to move said second movable means in its forward direction when said first movable means moves in its forward direction, and move said second movable means in its backward direction when said first movable means moves in its backward direction;
   first auxiliary force means for applying a first assisting force to said first movable means in addition to the driving force from said driving source when said first movable means moves in its forward direction, and for storing the first assisting force when said first movable means moves in its backward direction;
   second auxiliary force means for applying a second assisting force to said second movable means in addition to the driving force from said driving source when said second movable means moves in its backward direction, and for storing the second assisting force when said second movable means moves in its forward direction.

9. A variable magnification copying apparatus according to claim 8, wherein said first auxiliary force generating means comprises guide means for guiding said first movable means in a direction inclined with respect to the horizontal direction, said forward or backward displacement being respectively made in a downward or upward direction, and said first auxiliary force generated by said guide means being a partial component of the gravitational force along said downward direction.

10. A variable magnification copying apparatus according to claim 8,
wherein said first auxiliary force generating means is provided with resilient means connected to said first movable means for accumulating a resilient biasing force therein during the backward displacement of said first movable means and for liberating said accumulated resilient biasing force during the forward displacement of said first movable means.

11. A variable magnification copying apparatus according to claim 8, 9 or 10,
wherein said second auxiliary force generating means is provided with resilient means connected to said second movable means for accumulating a resilient biasing force during the forward displacement of said second movable means and for liberating said accumulated resilient biasing force during the backward displacement of said second movable means.

12. A variable magnification copying apparatus according to claim 11,
wherein said second drive transmission mechanism comprises a cam rotated by said drive source and having a cam surface maintained in pressure contact with said second movable means by means of the resilient force of said resilient means of said second auxiliary force generating means, said cam surface being structured in such a manner that the distance thereof from the rotational center of said cam progressively decreases in a portion corresponding to the forward displacement of said second movable means and progressively increases in a portion corresponding to the backward displacement of said second movable means.

13. A variable magnification copying apparatus according to claim 11, wherein said first optical means is fixed on said first movable means.

14. A variable magnification copying apparatus according to claim 13, wherein said first optical means includes a lens.

15. A variable magnification copying apparatus according to claim 8, 9 or 10, wherein said second optical means is connected to said second movable means through a resilient pulling member.

16. A variable magnification copying apparatus according to claim 15, wherein said second optical means includes a scanning mirror for scanning the original.

* * * * *